Patented July 13, 1943

2,324,014

UNITED STATES PATENT OFFICE 2,324,014

SUCCINYLSULPHATHIAZOLE

Maurice L. Moore, Detroit, Mich., assignor to Sharp & Dohme, Incorporated, Philadelphia, Pa., a corporation of Maryland No Drawing. Original application July 31, 1941, Serial No. 404,924. Divided and this application April 17, 1943, Serial No. 483,399

2 Claims. (Cl. 260—239.6)

This invention relates to a new sulphanilamide derivative, 2-$N^4$-succinylsulphanilamidothiazole, and includes also mono-carboxylate salts thereof.

The compound of the invention, as are also the mono-carboxylate salts thereof, is useful as an intestinal antiseptic for combatting and reducing the concentration of organisms causing intestinal infections. The primary product of the invention is prepared, for example, by heating succinic acid, succinic acid anhydride, or a mono-halide such as a mono-chloride of the alkyl ester of succinic acid, as

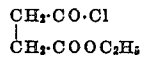

with sulphathiazole, i. e., 2-(p-aminobenzenesulphonamido)-thiazole, either merely together as when using succinic acid, or in an inert reaction medium such as an inert solvent as when using succinic anhydride, and in the latter case separating the desired end product, or as in the case of the use of the mono-chloride of the ester, liberating the desired end product by hydrolysis, and in any case, where necessary, subjecting the end product to purification as by recrystallization.

The invention may be illustrated by, but not restricted to, the following example:

2 - $N^4$ - succinylsulphanilamidothiazole. — 3.92 grams of succinic anhydride was added to a boiling suspension of 10 grams of 2-sulphanilamidothiazole in 100 cc. of alcohol. The mixture was then refluxed for five minutes after the addition was complete at which time all of the solids were in solution. The solution was then cooled and diluted with an equal volume of water. The white solid precipitate which formed was filtered and recrystallized from dilute alcohol, yielding 2-$N^4$-succinylsulphanilamidothiazole, melting at 184–186° C., represented by the formula

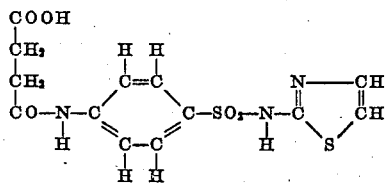

The product of the invention is generally practicably water-soluble and is a neutral compound which becomes very substantially soluble in water when the free carboxyl group thereof is converted to the carboxylate form by the use of the equivalent amount of alkali or ammonium hydroxide or amine or alkanolamine. The carboxylate form of the compound may have a solubility up to about fifty per cent or even higher.

The carboxylate form of the invention may be prepared, for example, by adding to a small amount of water an excess of the compound over its solubility in water and dissolving the excess by stirring in the required amount of, for example, anhydrous sodium carbonate. The solution is preferably filtered and from the filtrate the highly soluble sodium salt is isolated, for example, by adding an equal volume of alcohol and pouring the resulting solution into ten volumes of acetone. The substance thrown out of solution is permitted to settle and the supernatant liquid withdrawn and the residue preferably treated several times with fresh acetone. After decanting the acetone from the last treatment, the sodium salt may be dried preferably under vacuum.

Other metal carboxylate salts of the compound of the invention such as the copper, gold, iron and bismuth salts and the like may be obtained by reacting the alkali metal salt, preferably in aqueous solution, with a suitable soluble salt of the metal, the carboxylate salt of which is desired. The desired carboxylate salt is obtained by resulting double decomposition.

The compound of the invention has been found to give a prompt drop from one hundred million to as low as only sixty per cubic centimeter in the intestinal flora in dogs. It is especially effective as an intestinal antiseptic for it is possible to build up a high concentration of it in the intestinal tract without a simultaneously high blood level and yet with substantially no noticeable indication of toxic symptoms.

The compound of the invention, used as an intestinal antiseptic, is administered orally, either in the form of tablets, capsules or powders of the solid material.

This application is a division of my copending application Serial No. 404,924, filed July 31, 1941.

I claim:

1. 2-$N^4$-succinylsulphanilamidothiazole, represented by the structural formula

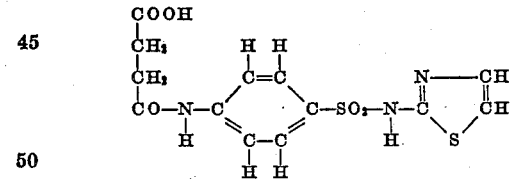

prepared for use as a therapeutic.

2. A compound of the group consisting of 2-$N^4$-succinylsulphanilamidothiazole and the carboxylates thereof, prepared for use as a therapeutic.

MAURICE L. MOORE.